United States Patent
Kumar et al.

(10) Patent No.: US 10,055,303 B1
(45) Date of Patent: *Aug. 21, 2018

(54) VIRTUAL MACHINE BLOCK AND SNAPSHOT CONSOLIDATION

(71) Applicant: EMC IP Holding Company LLC, Hopkinton, MA (US)

(72) Inventors: Kiran M V Kumar, Karnataka (IN); Vladimir Mandic, San Jose, CA (US); Manjunath Jagannatha, Bangalore (IN); Ravi Shankar Panem, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 662 days.

This patent is subject to a terminal disclaimer.

(21) Appl. No.: 14/686,400

(22) Filed: Apr. 14, 2015

(51) Int. Cl.
*G06F 17/30* (2006.01)
*G06F 11/14* (2006.01)

(52) U.S. Cl.
CPC .... *G06F 11/1453* (2013.01); *G06F 17/30094* (2013.01); *G06F 17/30138* (2013.01)

(58) Field of Classification Search
None
See application file for complete search history.

(56) References Cited

U.S. PATENT DOCUMENTS

| | | | |
|---|---|---|---|
| 7,797,279 B1* | 9/2010 | Starling | G06F 11/1451 707/641 |
| 8,117,168 B1* | 2/2012 | Stringham | G06F 11/1451 707/646 |
| 9,355,098 B2* | 5/2016 | Sawdon | G06F 11/1451 |

* cited by examiner

*Primary Examiner* — Belix M Ortiz Ditren
(74) *Attorney, Agent, or Firm* — Staniford Tomita LLP (57) ABSTRACT

Embodiments are directed to a virtual disk block consolidation process and system component that uses certain merging techniques to optimize the amount of disk space used by the incremental backup operations. The process merges the differencing disk at each user snapshot together so that a single backup copy is maintained. This helps reduce the space required to store the backups. A saveset consolidation is then performed so that the differencing disk representing the incremental backups are merged to a single backup that may represent either a synthetic full backup or a virtual full backup.

13 Claims, 11 Drawing Sheets

FULL  802

| PB 0 | PB 1 | PB 2 | PB 3 | SB 0 | PB 4 | PB 5 | PB 6 | | SB 1 |

LEVEL 1  804

| PB 0 | | PB 2 | | SB 0 | | | PB 6 | SB 1 |

LEVEL 2  806

| PB 0 | PB 1 | | | SB 0 | | PB 5 | | SB 1 |

MERGED  804

| PB 0 | PB 1 | PB 2 | PB 3 | SB 0 | PB 4 | PB 5 | PB 6 | | SB 1 |

| STEP | DESCRIPTION |
|---|---|
| 1 | Set bytes to read to payload block size |
| 2 | Get the target file position |
| 3 | Loop until the entire payload block is merged |
| 3(a) | Get the top index extent from the final merged array generated for this payload block zone. |
| 3(b) | Take minimum of extent length and bytes to read. |
| 3(c) | Get extent index to which stream it belongs in the incremental chain. |
| 3(d) | Get the corresponding stream object from the stream table array |
| 3(e) | Set the stream position |
| 3(f) | Read the minimum length fully |
| 3(g) | Write it to the target file at the target position |
| 3(h) | Advance the target position by (b) |
| 3(i) | Add the extent start offset by (b) |
| 3(j) | Decrement the extent length by (b) |
| 3(k) | Decrement the bytes read by (b) |
| 3(l) | If extent length is zero then move the top index to the next distributed stream extent. |
| 4 | End of loop |

FIG. 10A

| STEP | DESCRIPTION |
|---|---|
| 1 | Set bytes to read to payload block size |
| 2 | Get the target file position |
| 3 | Loop until the entire payload block is merged |
| 3(a) | Get the top index extent from the final merged array generated for this payload block zone. |
| 3(b) | Take minimum of extent length and bytes to read. |
| 3(c) | Get extent index to which stream it belongs in the incremental chain. |
| 3(d) | Get the corresponding stream object from the stream table array |
| 3(e) | set ddp_synthesize extent to current extent start and length |
| 3(f) | call ddp_synthesize_file API |
| 3(g) | Advance the target position by (b) |
| 3(h) | Add the extent start offset by (b) |
| 3(i) | Decrement the extent length by (b) |
| 3(j) | Decrement the bytes read by (b) |
| 3(k) | If extent length is zero then move the top index to the next distributed stream extent. |
| 4 | End of loop |

VIRTUAL MACHINE BLOCK AND SNAPSHOT CONSOLIDATION

CROSS-REFERENCE TO RELATED APPLICATIONS

The present application is related to U.S. patent application Ser. No. 14/686,650 entitled "Mountable Container Backups For Files," U.S. patent application Ser. No. 14/686,438 entitled "Presenting Virtual Machine Backup Files for Block and File Level Restore," and U.S. patent application Ser. No. 14/686,468 entitled "Block Changes Framework for Delta File Incremental Backup," all assigned to the assignee of the present application, and each incorporated herein by reference in its entirety

TECHNICAL FIELD

Embodiments are generally directed to networked-based data backup, and more specifically to block consolidation for backing up virtual machines.

BACKGROUND

Backup and recovery software products are crucial for enterprise level network clients. Customers rely on backup systems to efficiently back up and recover data in the event of user error, data loss, system outages, hardware failure, or other catastrophic events to allow business applications to remain in service or quickly come back up to service after a failure condition or an outage. Data protection and comprehensive backup and disaster recovery (DR) procedures become even more important as enterprise level networks grow and support mission critical applications and data for customers.

The advent of virtualization technology has led to the increased use of virtual machines as data storage targets. Virtual machine (VM) disaster recovery systems using hypervisor platforms, such as vSphere from VMware or Hyper-V from Microsoft, among others, have been developed to provide recovery from multiple disaster scenarios including total site loss. The immense amount of data involved in large-scale (e.g., municipal, enterprise, etc.) level backup applications means that backup disk space is a critical concern for system administrators.

The backup of virtual machines in a hypervisor is done typically through one of a couple of different ways. In a first method, each VM is handled as a physical machine. This means installing and running a backup agent in each VM, which is resource intensive and becomes cumbersome from a management perspective as the number of virtual machines increases. A second method is to back up a VM at the storage level by making a copy of the storage containers that contain the VM. Identifying the exact storage containers that contain the VM and getting them to be in a consistent state are aspects that must be managed and that also adds administrative overhead to the process.

Backup strategies typically involve a combination of full and incremental or differential backups. A full backup backs up all files from a data source in a specified backup set or job, while an incremental backup backs up only changed and new files since the last backup. During an incremental backup procedure, an application may walk the file system and find which of the files that has been changed. However, walking the file system is slow and resource intensive. Another conventional method of incremental backup uses a changed block tracking (CBT) feature provided by a virtual machine monitor or manager to keep track of data blocks changed since last backup. The CBT changes are captured in a separate file which links to its immediate parent.

To prevent version skew and potential data corruption, most high availability systems perform backups on a snapshot of the system, which is a read-only copy of the data set at a particular point hr time, and allow applications to continue writing to their data. In the case of conventional backup methods, the number of payload blocks to be backed up equals the number of user snapshots multiplied by the number of changed blocks. If any or all of these factors is relatively large, the amount of space needed to accommodate the backup can be significant.

What is needed, therefore, is a backup method that consolidates virtual disk blocks to optimize space in VM-based data storage systems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
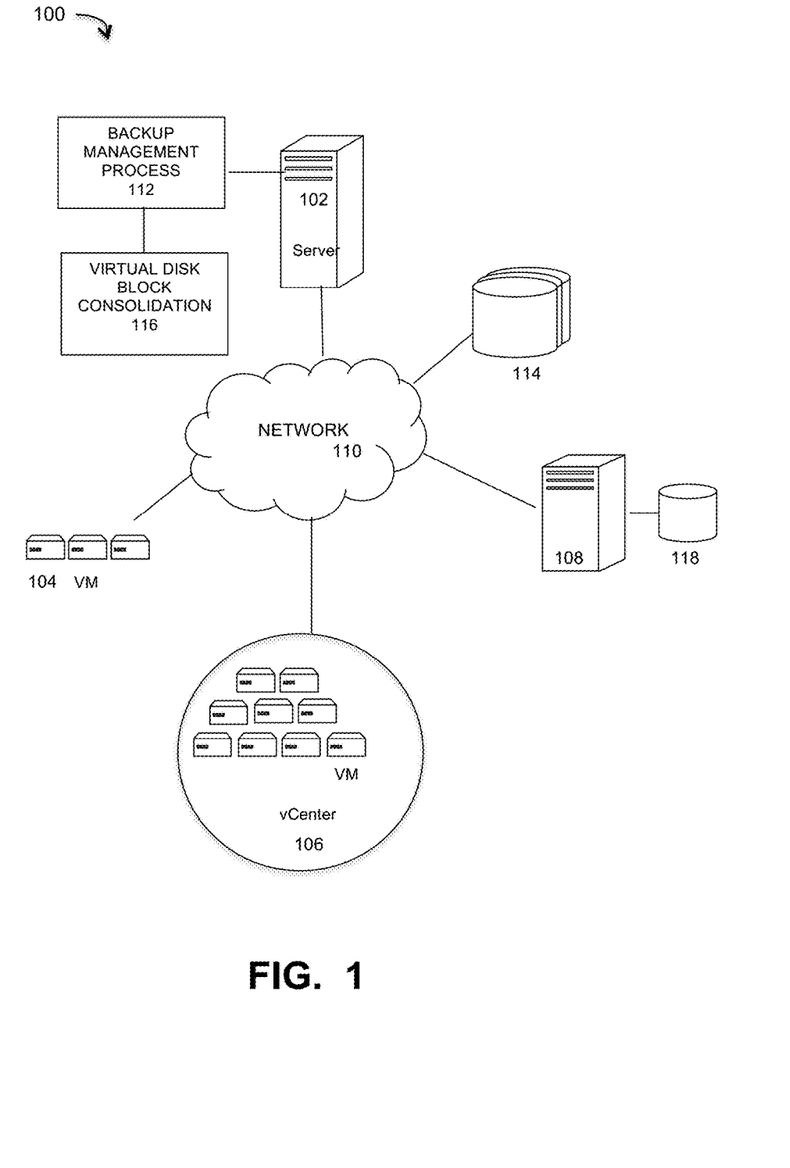
FIG. 1 is a diagram of a large-scale network implementing a data recovery process that provides instant availability of VM backup files without requiring network share, under some embodiments.

FIG. 1 illustrates a computer network system 100 that implements one or more embodiments of block consolidation method and system for backing up virtual machines VMs in a large-scale computer network. In system 100, a number of VMs or groups of VMs 104 are provided to serve as backup targets. Target VMs may also be organized into one or more vCenters 106 representing a physical or virtual network of many virtual machines (VMs), such as on the order of thousands of VMs each. The VMs serve as target storage devices for data backed up from one or more data sources, such as computer 108, which may have attached local storage 118 or utilize networked accessed storage devices 114. The data sourced by the data source may be any appropriate data, such as database data that is part of a database management system. In this case, the data may reside on one or more hard drives (118 and/or 114) and may be stored in the database in a variety of formats. One example is an Extensible Markup Language (XML) database, which is a data persistence software system that allows data to be stored in XML format. Another example is a relational database management system (RDMS) which uses tables to store the information. Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 102 is coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118), or network storage (e.g., 114), which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. In a preferred embodiment, the data source storage is provided through VM or physical storage devices, and the target storage devices represent disk-based targets implemented through virtual machine technology.

For the embodiment of FIG. 1, network system 100 includes a server 102 that executes a data backup process with virtual disk block consolidation for optimized storage space utilization. The backup management process 112 automates the backup of network data using the target VM devices. In an embodiment, the process 112 uses certain known full and incremental backup techniques along with a process or system component 116 that consolidates virtual disk blocks to optimize the storage space utilized in the VM targets 104 and 106.

In an embodiment, system 100 may represent a Data Domain Restorer (DDR)-based deduplication storage system, and storage server 128 may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common inter et file system) namespaces, as well as DD Boost provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files.

As is known, virtual machine environments utilize hypervisors to create and run the virtual machines. A computer running the hypervisor is a host machine and all virtual machines are guest machines running guest operating systems (OS). The hypervisor provides the guest OSs with a virtual operating platform and manages the execution of the VMs. In an embodiment; the backup management process 112 is configured to operate with the Hyper-V hypervisor, which is a native hypervisor that creates VMs on Intel x86-64 based systems and is an integral part of the Microsoft Windows server products. In general, Hyper-V implements isolation of virtual machines in terms of a partition, which is a logical unit of isolation, supported by the hypervisor, in which each guest operating system executes. A hypervisor instance has to have at least one parent partition. The virtualization stack runs in the parent partition and has direct access to the hardware devices. The parent partition then creates the child partitions which host the guest OSs. A parent partition creates child partitions using an API.

In an embodiment, system 100 represents a backup platform (e.g., EMC Networker) that supports block-based backups (BBB) of volumes and files in a virtual hard disk (VHD or VHDx) format. For this embodiment, the files to be backed up are virtual hard disk files that may be formatted as a VHD (Microsoft Virtual Hard Disk Image) or Microsoft VHDx file. The VHDx format is a container format, which can contain disk related information. VHDx files can be mounted and used as a regular disk. Volumes such as NTFS/ReFS/FAT32 or any file system which the OS supports on the mounted disk can also be created. Differencing VHDx's can be created which will have internal references to parent VHDx. Block based backups typically bypass files and file systems almost completely. The operating system file system divides the hard disk, volume or RAID array into groups of bytes called blocks (fixed size) or extents (variable size), which are typically ordered 0-N. A differencing disk is generally a type of virtual hard disk VHD that stores and manages changes made to another VHD or its parent VHD, and is used in virtual environments to track, store, manage and restore only the changes or modifications applied oil a VHD.

Figure 2:
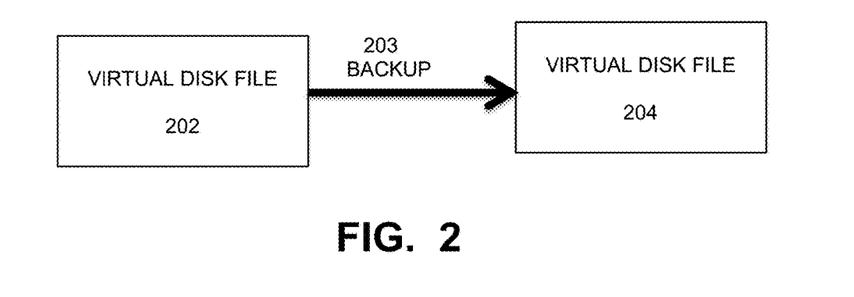
FIG. 2 illustrates an example virtual disk that may be used in a backup operation, in accordance with some embodiments.

FIG. 2 illustrates an example virtual disk that may be used in a backup operation, in accordance with some embodiments. As shown in FIG. 2, a volume may be configured to store information that needs to be backed up through a backup operation 203. For example, the volume may be associated with a database or repository or other data source, and may be referred to as a parent volume. In an embodiment, the backup process 112 backs up a virtual machine, which are represented as virtual disks. Thus, as shown in FIG. 2, virtual disk file 202 is backed up by operation 203 to virtual disk file 204. File 204 may be configured to store any and all back up information related to the virtual disk file 202. The file 204 may be created based on a virtual disk format and may contain information typically contained in a physical volume.

For some embodiments, the file 204 may be created based on the Hyper-V Virtual Hard Disk (VHDX) format according to the VHDX Format Specification, published by Microsoft Corp. The file 204 may be referred to as a VHDx file and may be mounted by an operating system that supports VHDx files. One example of such an operating system is the Microsoft Windows Server 2012 by Microsoft Corp. The file 204 may be configured to store full backup information of a parent volume (e.g., volume 202). For some embodiments, the backup operation that backs up the parent volume to the file 204 may be performed using a block based backup (BBB) operation. In a block based backup, the information may be read from the parent volume block by block regardless of the number of files stored in the parent volume. The backup operation may take an image of the parent volume without having to refer to the file system associated with the parent volume.

The processes of system 100 can be used in scenarios where there is a need to backup a database (e.g., Microsoft Exchange database), or where there is an application in which it would be desirable to backup multiple files (e.g., two or more files) present in a particular folder on the source volume, and such files can be very large. The system can be used to backup data at the block-level, e.g., a block-based sub-file backup. A technique of the system provides for backing up the used blocks of a file by identifying the file extents occupied by the file. In general, a file extent is a contiguous area of storage reserved for a file in a file system, represented as a range, and any file can have zero or more extents. The file extents provide the starting offset and the length of the particular extent occupied by the file. In other specific embodiments, the system further provides for incremental backups and artificially synthesizing full backups at the file or sub-file level.

The backup storage server 102 includes a catalog and local backup media and/or interfaces to other VM-based backup target to store data backed up from the data source 108 or other clients. The backed up data may include a volume, portion of a volume, applications, services, user-generated or user data, logs, files, directories, databases, operating system information, configuration files, machine data, system data, and so forth. The catalog provides an index of the data stored on the backup storage server or protection storage managed by the backup storage server. The backed up data may be stored a logical entity referred to as a saveset. The catalog may include metadata associated with the backup (e.g., saveset) such as an identification of the file or files stored on the backup storage server (e.g., globally unique identifier (GUID) of a backed up database), the time and date of backup, size of the backup, path information, and so forth.

For some embodiments, one or more differential or incremental backups for Hyper-V backups in which the data to be backed up is already in a virtual disk format, such as VHD/VHDx. The incremental backup virtual disks may be created after the creation of the file 204, which stores the full backup information of the parent volume. The incremental backup virtual disks may store only the changed blocks in the parent volume. The set of a full backup virtual disk and one or more incremental backup virtual disks may be saved together as a single virtual disk (e.g., VHDx) in a backup disk and can be mounted for recovery. The full backups and incremental backups comprise virtual disk files, which are merged to create an artificially synthesized full backup.

In general, whenever a Hyper-V backup operation is initiated to backup a VM, for each virtual disk comprising a VM, a differencing disk denoted as AVHD/AVHDX, is created to capture future writes to the virtual disk. An AVHD (or AVHDX) file is essentially a differencing disk that is a child of another VIM (or VHDX) file. AVHD means an automatically Managed VHD that is managed by Hyper-V. VHD/VHDX and AVHD/AVHDX use the same file format. The AVHD is a snapshot differencing disk file, where a snapshot is an image of the system at a point in time where the current running configuration of the virtual machines is saved to the AVHD. In general, when the AVHD is created, the original VHD is no longer modified and the snapshots are merged with the original VHD only when it is powered off. For disaster recovery usage, it may be preferable to manually merge snapshots certain implementations, this is done by changing file extensions (e.g., changing the extension of the newest AVHD file to VHD) so that any AVHD will always go to its parent, not the root parent, A linear chain of snapshots can then be built, e.g., VHD-AVHD1-AVHD2-AVED3-AVHD4, where AVHD4 is the newest and AVHD1 is the oldest.

For a full backup for Hyper-V, when the first backup is taken and if there are no user snapshots, then there will be single VHD/VHDX file representing a disk. Backing up this file then amounts to a full backup. If there are user snapshots during first full backup, then there would be a parent VHD/VHDX file and one or more AVHD/AVHDX files depending on the number of user snapshots. In this case, this VHD/VHDX and AVHD/AVHDX file chain is merged and saved as full backup.

For an incremental backup in Hyper-V, after taking a backup (full or incremental) at time instant T1 later when an incremental backup is initiated at T2, if there is only a single AVHDX after the previous backup, backing up this file amounts to an incremental backup. However if there are multiple AVHD/AVHDX files owing to user snapshots between T1 and T2, these files are merged together as a single VHD/VHDX file and backed up as an incremental backup.

For managing Hyper-V full and incremental backups in a deduplication backup storage device, such as a DDR appliance, rebasing to another file with in the same system is allowed through an API. This rebasing operation i.e., referring a range/zone/extent of a file to another file present in the same DD machine is very fast (practically instantaneous). This enables one to create very fast full backups. Hence, during each incremental backup, previous VHDX full backups are merged with new a VHDx and stored as a full backup.

With respect to managing Hyper-V full and incremental backups in an advanced type random access device, such as a normal disk, at each incremental backup, the newly created virtual hard disk file (single or multiple merged AVHD/AVHDX files) is stored as a differencing disk to the previous backup. These full and incremental backups can be further merged to create artificially synthesized backups when required. This is referred to as a virtual full backup.

Thus, the full backup information in the full backup virtual disk and the one or more incremental backup information in the incremental backup virtual disks may be merged together to form merged backup information which may then be saved in a backup medium. The merged backup information may be stored as a virtual disk (e.g., a VHDx) and may include merged sections of the full backup virtual disk and one or more incremental backup virtual disks. In an embodiment, the backup manager process merges the base and its differencing disks on the fly (i.e., during runtime execution of the backup operations) and creates one single image stream representing the merged content. Subsequent incremental backups also can take single differencing disk or multiple differencing disks for merging and creates a link that connects to the parent backup image on the remote machine.

Figure 3:
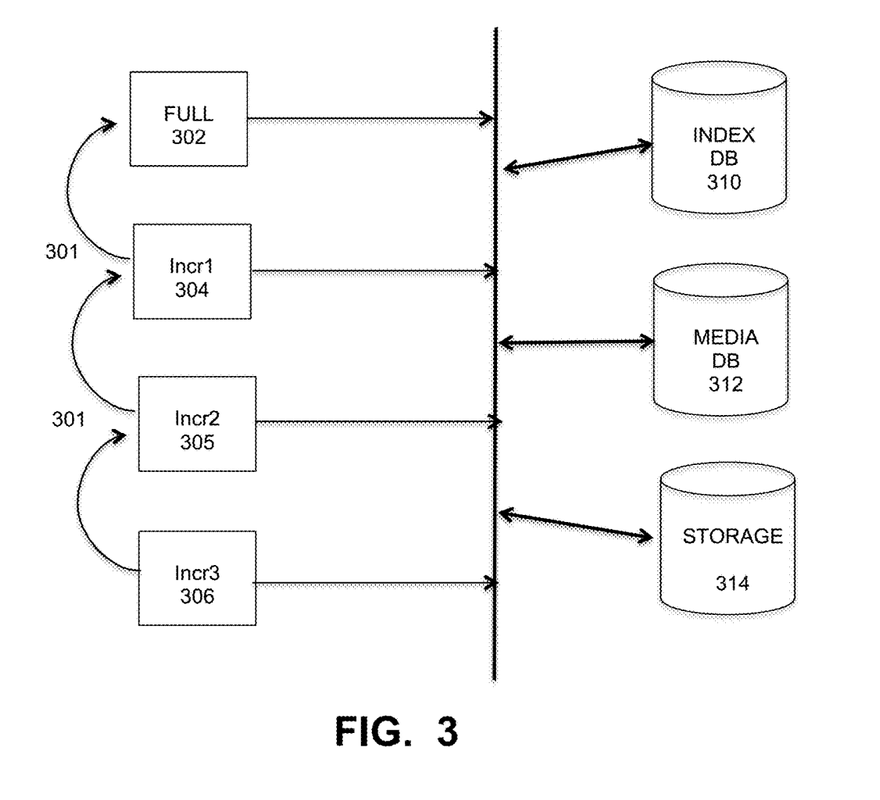
FIG. 3 illustrates a backup situation that can utilize the virtual disk consolidation process 116 to improve storage space utilization.

FIG. 3 illustrates a backup situation that can utilize the virtual disk consolidation process 116 to improve storage space utilization. As shown in FIG. 3 a backup operation comprises a full backup 302, followed by a number of incremental backups 304-306, such as three incremental backups denoted Incr, Incr1 and Incr2. Three databases represented as Index DB 310, Media DB 312, and Storage DB 314 contain an number of entries or files, such as Index DB: 4 entries, Media DB: 4 entries, and Storage: 4 files. Each VM comprises a set of virtual disks and configuration files. In conventional backup workflows, the differencing disk created at each user snapshot must be backed up. The differencing disk at each level of the chain 301 must be maintained as separate backups, thereby increasing the number of resources to maintain, i.e., the Index, Media and Storage database requirements. In an embodiment, the virtual disk block consolidation process 116 uses certain merging techniques to optimize the amount of disk space used by the incremental backup operations. The process merges the differencing disk at each user snapshot together so that a single backup copy is maintained. This helps reduce the space required to store the backups. A saveset consolidation is then performed so that the differencing disk representing the incremental backups are merged to a single backup.

Figure 4:
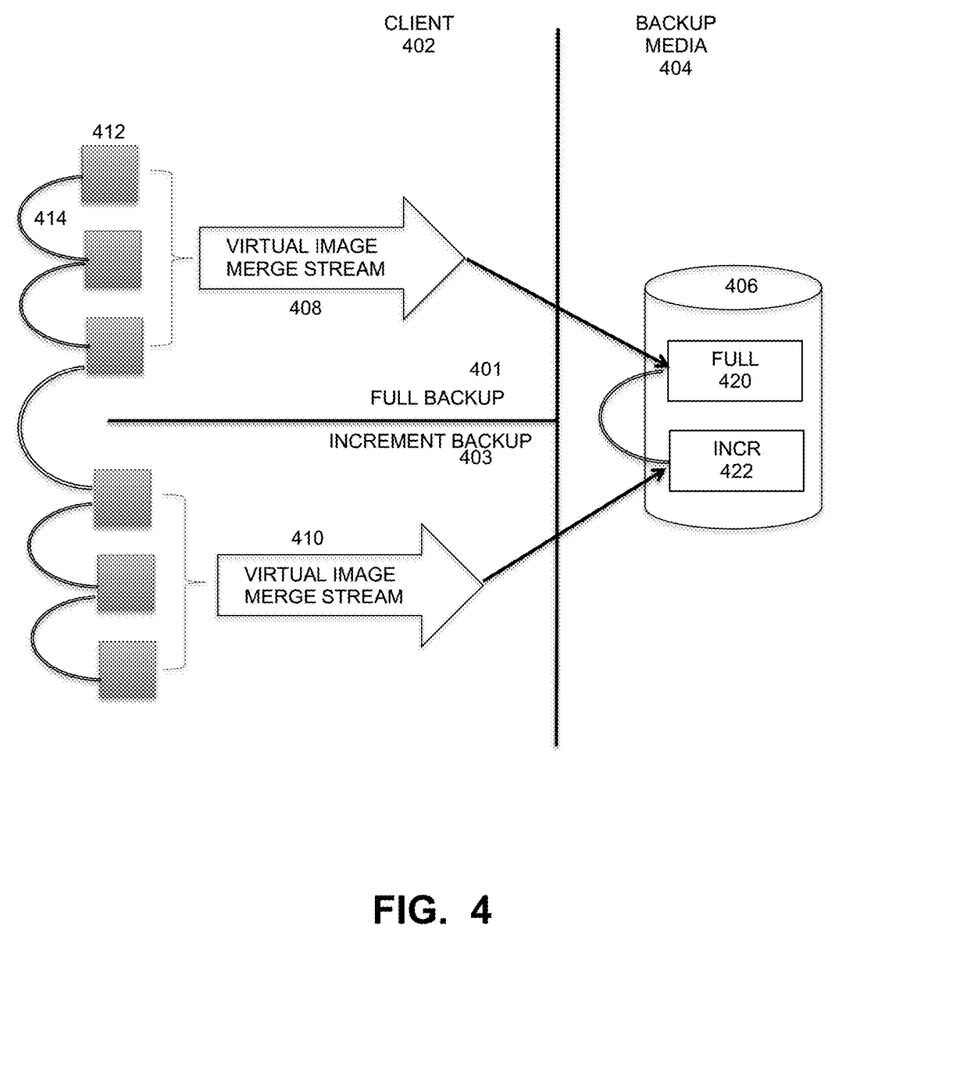
FIG. 4 illustrates the process of merging base and differencing disk chains, under an embodiment.

FIG. 4 illustrates the process of merging base and differencing disk chains, under an embodiment. FIG. 4 illustrates an Hyper-V backup architecture in which parent image files 412 are linked to child image files through links 414. In the case of a full backup 401, a virtual image merge stream 408 from the image files is derived on the client side 402 and stored on the backup media side 404 as a full backup file 420 on physical disk 406. Likewise, in the case of an incremental backup 403, a virtual image merge stream 410 from the image files is derived on the client side 402 and stored on the backup media side 404 as an incremental backup file 422 on physical disk 406. This mechanism allows a differencing disk at each user snapshot to be merged together so that a single backup copy is maintained. This helps reduce the space required to store the backups. After save set consolidation, the differencing disk representing the incremental backups are merged to a single backup. This is significantly different than present known processes in which a differencing disk created at each user snapshot must be backed up, and the differencing disk at each level of the chain must be maintained as separate backups thereby increasing the number of resources to maintain, such as index, media, and storage database requirements.

Virtual Full or Synthetic Full Backups

In embodiment, the virtual disk block consolidation process is used to perform full backups of virtual disks. In general, this method is only applicable where the backup is done to de-duplicate boxes where rebasing to another file with in the same system is allowed through an API (application program interface). This rebasing operation refers to a range/zone/extent of a file to another file present in the same DD or system machine and is typically is very fast, thus enabling one to create very fast full backups. For purposes of explanation, embodiments of the method refer to backups to Data Domain and DD Boost systems, but embodiments are not so limited and other platforms can also be used. The DD Boost Library exposes APIs to integrate with a Data Domain system using an optimized transport mechanism. These API interfaces exported by the DD Boost Library provide mechanisms to access or manipulate the functionality of a Data Domain file system. DD devices support both NFS and CIFS protocol for accessing files.

Figure 5:
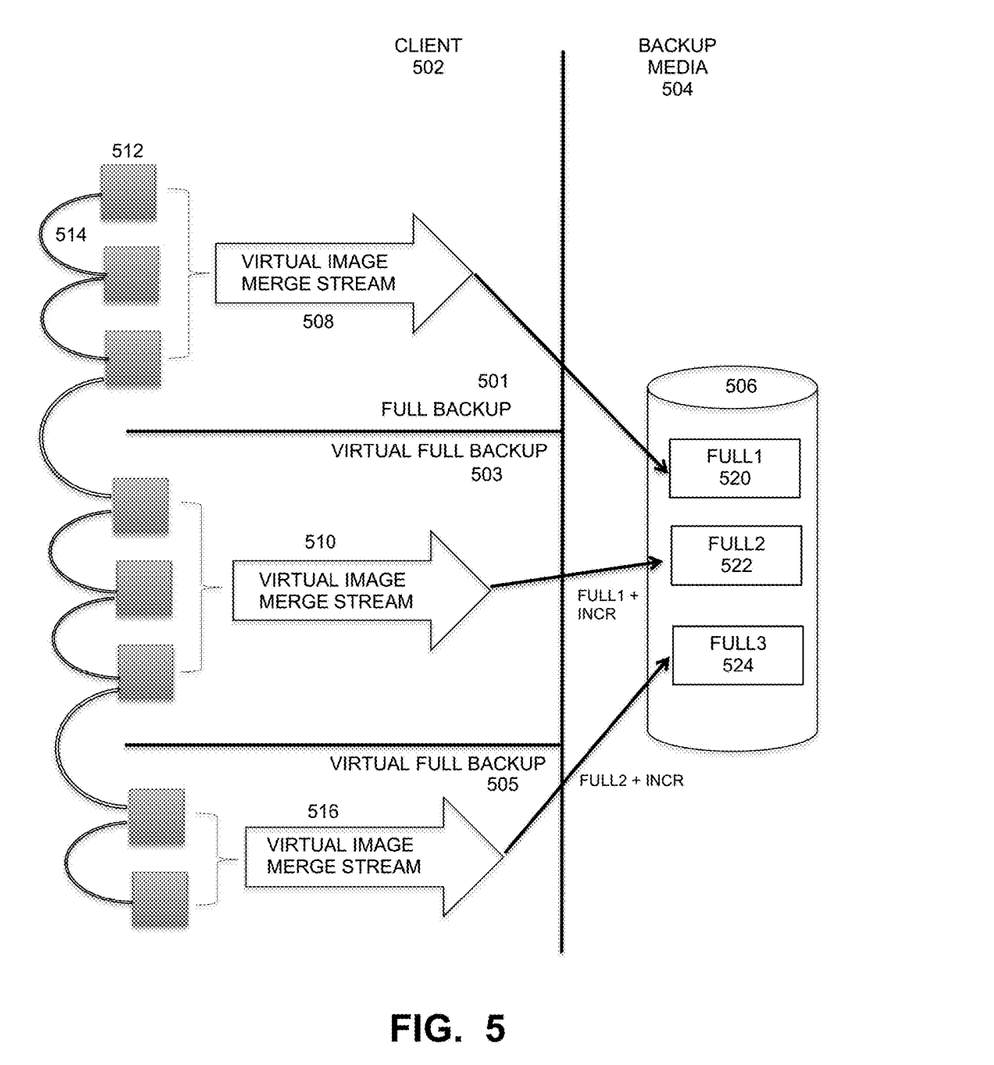
FIG. 5 illustrates virtual full backups of hypervisor image files performed by a virtual disk consolidation process, under an embodiment.

FIG. 5 illustrates virtual full backups of hypervisor image files performed by a virtual disk block consolidation process, under an embodiment. FIG. 5 represents an alternative to the FIG. 4 Hyper-V backup architecture in which parent image files 512 are linked to child image files through links 514. As with the case of FIG. 4, in the case of a full backup 501, a virtual image merge stream 508 from the image files is derived on the client side 502 and stored on the backup media side 504 as a full backup file 520 on physical disk 506. This first full backup is referred to as Full1 520, and is followed by two virtual full backups 503 and 505 that create corresponding Full2 and Full3 backups 522 and 524. The first virtual full backup 503 uses a virtual image merge stream 510 based on the Full1 backup and a first incremental backup, while the second virtual full backup 505 uses a virtual image merge stream 516 based on the Full2 backup and a second incremental backup. FIG. 5 illustrates, during each incremental backup, the merging of a previous VHDx full backup with new VHDx and storing as a full backup, as described above.

Embodiments can also be used to perform synthetic full backups. A synthetic backup is identical to a regular full backup in terms of data, but it is created by collecting data from a previous, older full backup and assembled with subsequent incremental backups. The result of combining a recent full backup archive with incremental backup data creates two kinds of files which is merged to create the synthetic backup. Because it is not created from original data, it is referred to as synthetic. In general, this method is applicable to advanced file type random access devices like a disk. The same format VHD/VHDx is used to backup file and incremental blocks at file level. This involves creation of backup volume on the client machine with the required parameters for which the file is to be backed up. A child differencing disk is created during a user snapshot. When an incremental backup is initiated all the user level snapshots taken since the previous full backup are merged and saved as a child differencing disk of previous full backup.

Figure 6:
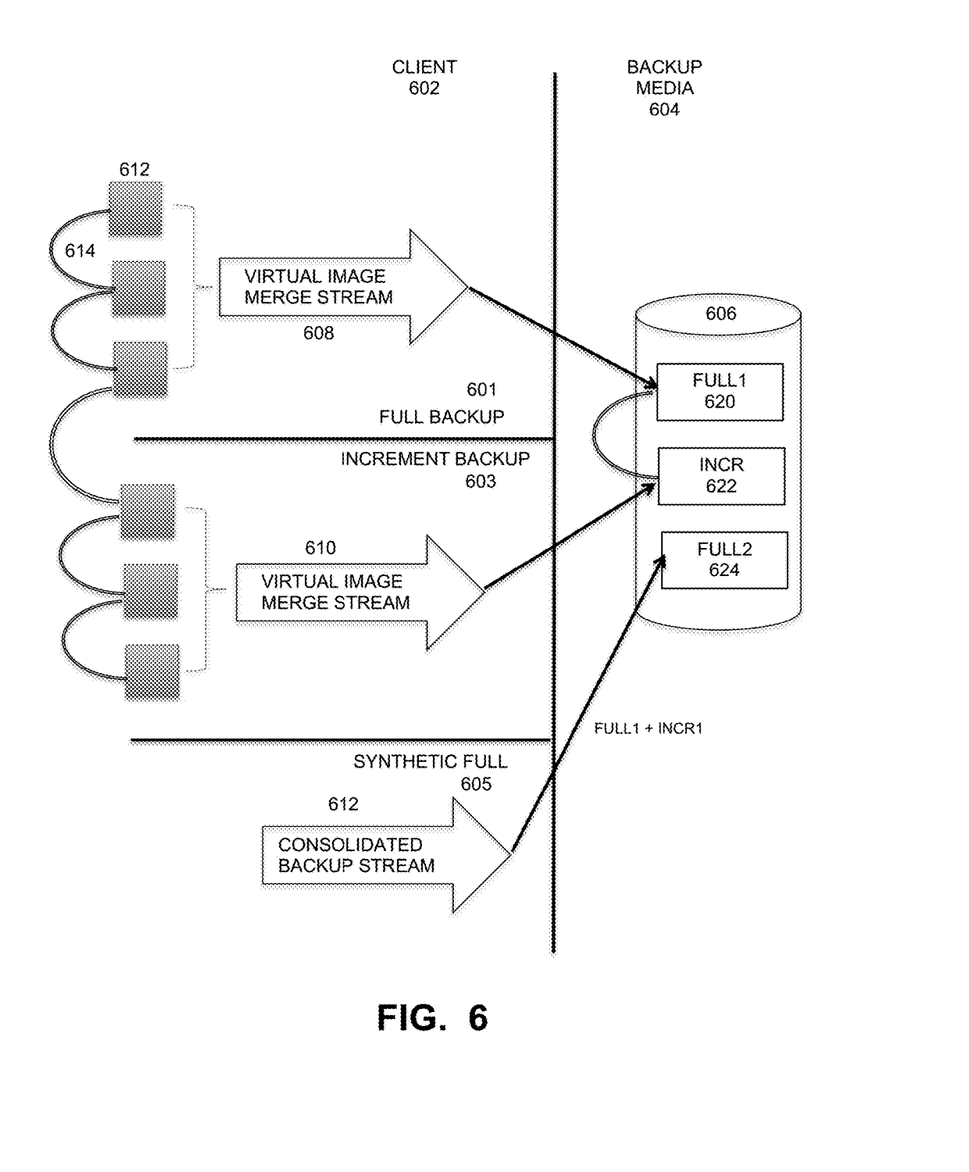
FIG. 6 illustrates synthetic full backups of hypervisor image files performed by a virtual disk consolidation process, under an embodiment.

FIG. 6 illustrates synthetic full backups of hypervisor image files performed by a virtual disk consolidation process, under an embodiment. FIG. 6 represents an alternative to the FIG. 4 Hyper-V backup architecture in which parent image files 612 are linked to child image files through links 614. As with the case of FIG. 4, in the case of a full backup 601, a virtual image merge stream 608 from the image files is derived on the client side 602 and stored on the backup media side 604 as a full backup file 620 on physical disk 606. Likewise, in the case of an incremental backup 603, a virtual image merge stream 610 from the image files is derived on the client side 602 and stored on the backup media side 604 as an incremental backup file 622 on physical disk 606. A synthetic full backup 605 is then performed in which consolidated backup stream 612 uses the Full1 backup 601 and the incremental backup 603 to create a Full2 backup 624 that is stored on disk 606. FIG. 6 illustrates, during each incremental backup, a newly created VHD file stored as a differencing disk to the previous backup, as described above.

Merging Payload Blocks

Full and incremental file changes may be scattered across multiple backup copies. In an embodiment, a full or synthetic full backup of a file is created by inspecting each of the backup copies and merging those. The virtual disk format allows changes to be represented within the format itself in terms of sector bitmap and Block Allocation Table (BAT). The synthetic full backup of the file can be created without altering the backup copies. In general, any number of incremental file backups may be merged with a full backup. For example, there can be one, two, three, four, five, six, seven, eight, nine, ten, or more than ten incremental backups of a file that are merged with a full backup of the file to create a full or synthetic full file merge of the file. Depending upon factors such as the type of backup media, computing resources available, and other factors a synthetic full file merge may be performed as soon as the first incremental backup of the file is made, after a threshold number of incremental backups have been made, periodically (e.g., weekly), or on demand. In a specific embodiment, an incremental backup is performed in which changed blocks associated with a file are obtained. In this specific embodiment, rather than creating a child VHDX, the changed blocks are merged with a previous full or parent backup to artificially create a current full file backup. The newly synthesized full file backup then includes original unchanged blocks from the parent backup and new incremental or changed blocks. Thus, recovery of the file does not have to depend on any previous incremental backups. A method of the system may employ a single pass approach that generates a single target stream which contains the merged data of the previous full and its changed blocks in a sequential manner, which can then be streamed to any backup media. Merged data zones from the entire chain are identified. Since the VHDx is itself described in terms of payload blocks, the method first determines what payload blocks needs to be merged in the entire chain of backups. The merge granularity is a payload block which can vary from 1 MB to 256 MB according to the VHDx specification. This method merges one payload block at a time and proceeds to the next.

The single VHDx stream may be configured to have a specific header, region, log, and merged BAT, which is streamed to a new file. The BAT is a region listed in the region table and includes a single contiguous array of entries specifying the state and the physical file offset for each block. The entries for payload blocks and sector bitmap blocks in the BAT are interleaved at regular intervals. Any updates to the BAT may be made using the log to ensure that the updates are safe to corruptions from system power failure events. The new merged BAT table includes offsets relative to the new target file which will be eventually streamed to the new synthesized file once the new empty VHDx file is streamed out to the target. The new merged BAT table is prepared by inspecting the BAT entries of each of the backup starting from full backup to N-1 incremental chain. If there is a BAT entry that contains a non-zero offset that means the payload block which the index corresponds to needs to be merged.

Figure 7:
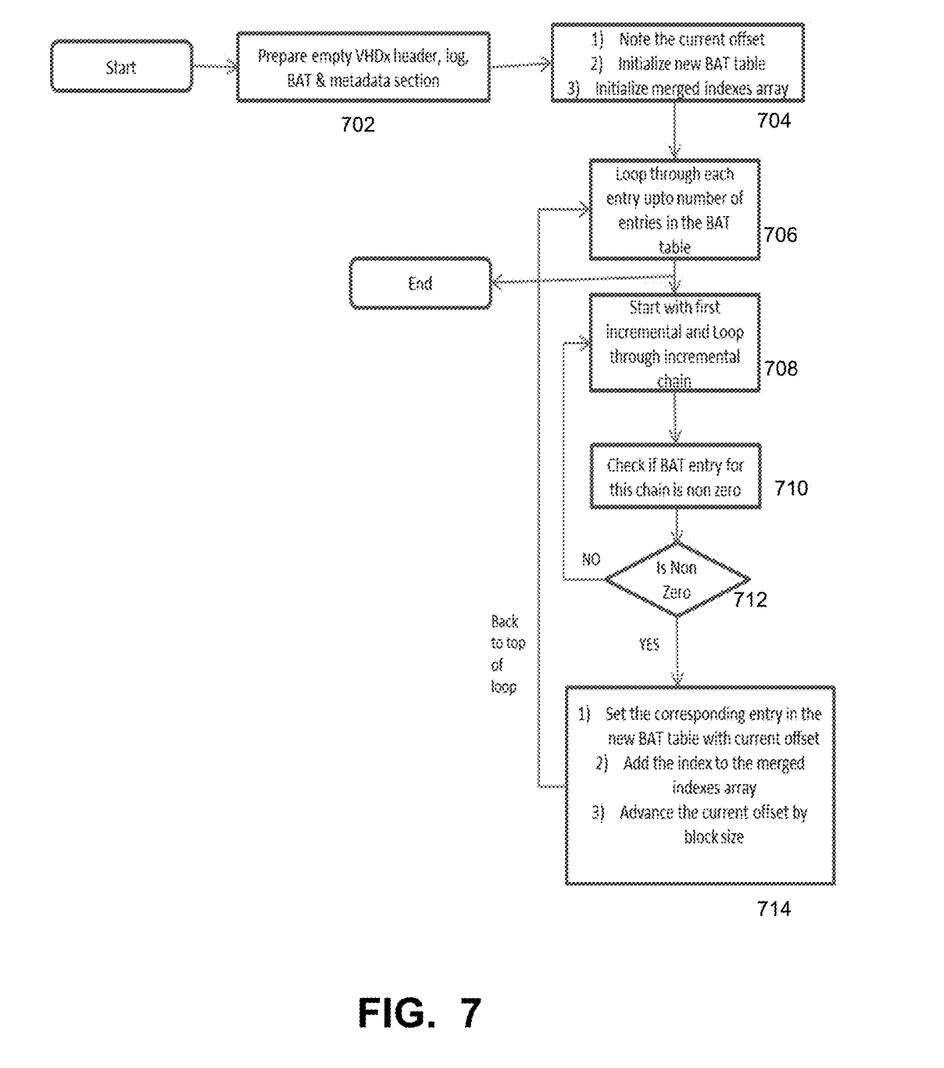
FIG. 7 is a flowchart that illustrates a method of determining common payload blocks across an incremental backup chain to generate a new BAT table, under an embodiment.

FIG. 7 is a flowchart that illustrates a method of determining common payload blocks across an incremental backup chain to generate a new BAT table, under an embodiment. This method basically illustrates method steps that involve merging of payload blocks one by one for merging of volume block based backups. The new merged BAT table includes offsets relative to the new target file which will be eventually streamed to the new synthesized file once the new empty VHDx file is streamed out to the target. The new merged BAT table is prepared by inspecting the BAT entries of each of the backup starting from full backup to N-1 incremental chain. If there is a BAT entry that contains a non-zero offset that means the payload block which the index corresponds to needs to be merged. As shown in FIG. 7, in a step 702, the system prepares an empty VHDx header, log, BAT, and metadata section. In a step 704, the system notes or identifies the current offset, initializes the new BAT table, and initializes the merged indexes array. In a step 706, the system loops through each entry up to the number of entries in the BAT table. In a step 708, the system starts with the first incremental and loops through the incremental chain. In a step 710, the system checks if the BAT entry for the chain is non zero. If the BAT entry is non zero, as determined in decision block 712, the system loops back to step 708. Alternatively, if the BAT entry is non zero, in a step 716 the system sets the corresponding entry in the new BAT table with the current offset, adds the index to the merged indexes array, and advances the current offset by the block size. The process then loops back to the top of the loop at step 706.

Figure 8:
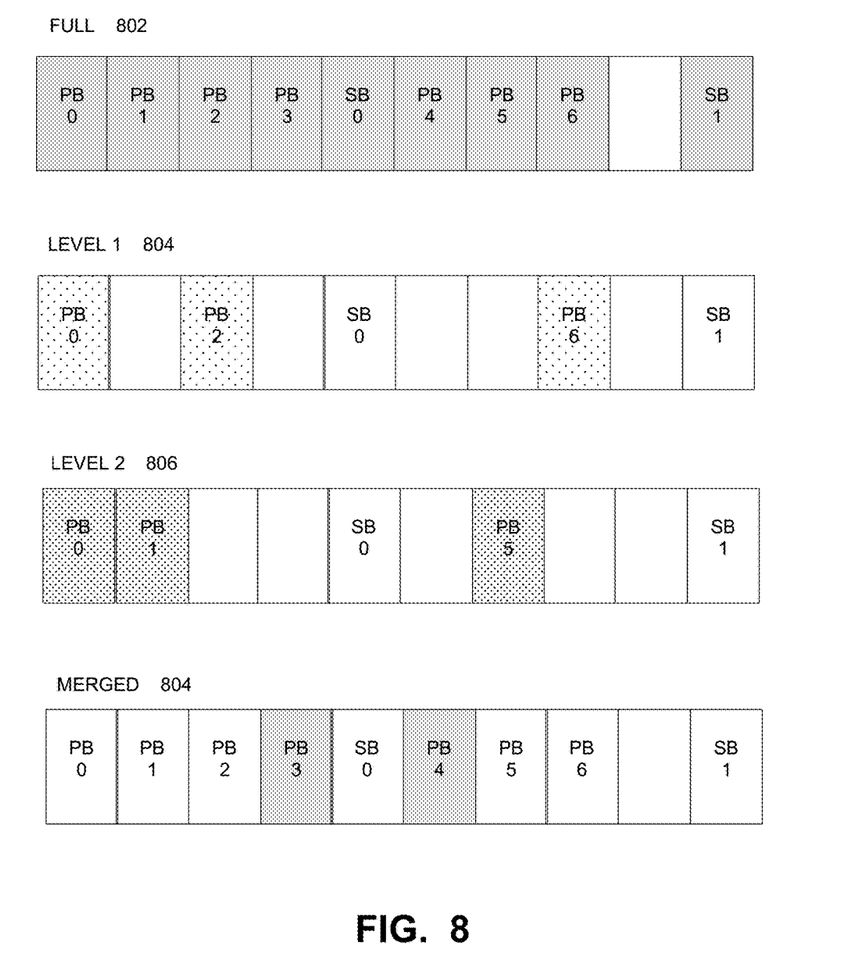
FIG. 8 is a block diagram showing a merged distributed stream extents of a full backup followed by two incremental backups in an example implementation.

FIG. 8 is a block diagram showing a merged distributed stream extents of a full backup followed by two incremental backups in an example implementation. As shown in FIG. 8, the structure of BAT table is shown as a region having a single array of 64-bit values, with an entry for each block that determines the state and file offset of that block. PB refers to an entry for a payload block and SB refers to an entry for a sector bitmap block. The entries for the payload block and sector bitmap block are interleaved in a way that the sector bitmap block entry associated with a chunk follows the entries for the payload blocks in that chunk. For example, if the chunk ratio is 4, the table's interleaving would be as shown in the example of FIG. 8.

Figure 9:
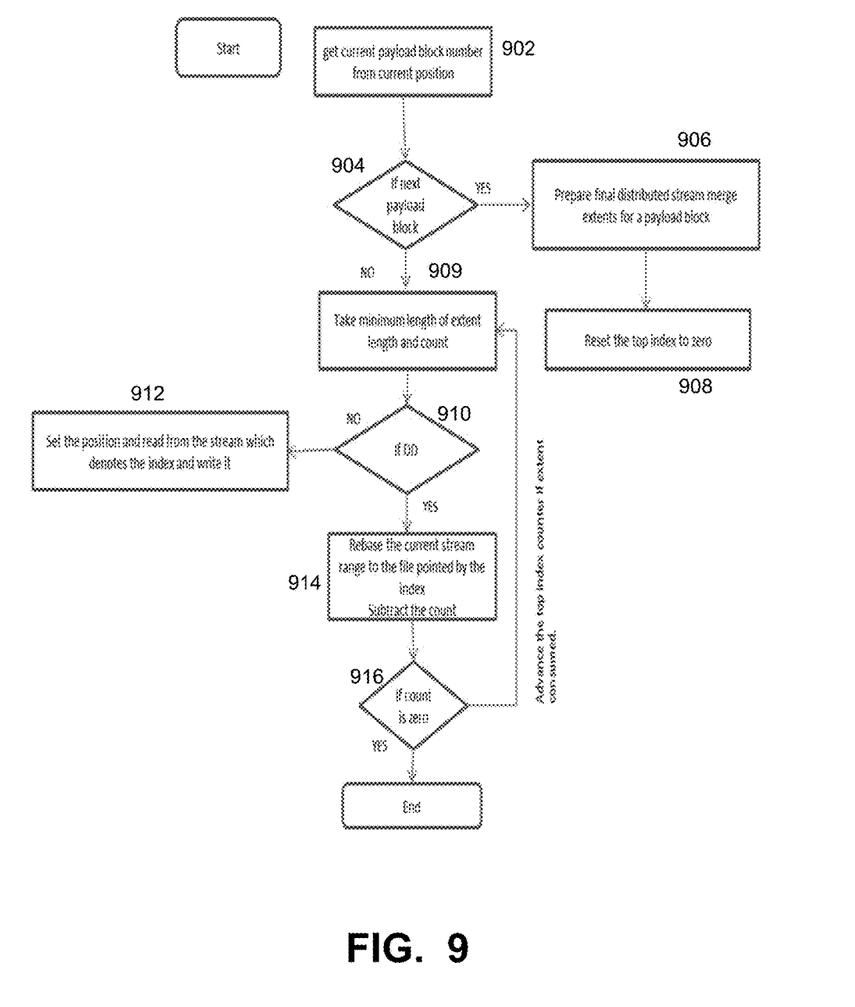
FIG. 9 is a flow diagram illustrating a flow for distributed stream extents representing merged payload block areas across an entire incremental chain.

In the example shown in FIG. 8, the payload block size is 2 MB and all payload blocks are fully occupied, e.g., (0,2048K) for a full backup level 802. Merged extents within common payload block are in the following format "(start, length, id)" where id refers to which level of the backup. The payload blocks which need to or should be merged are shown with a pattern of gray boxes. For the level 1 backup 804 (the first incremental backup), the payload blocks are shown in sparse dotted pattern and comprise PB0=(0, 1K), (4K, 8K), PB2=(16K, 32K) and PB6=(256K, 16K). For the level 2 backup 806 (the second incremental backup), the payload blocks are shown in dense dotted pattern and comprise PB0=(4K, 2K), PB2=(20K, 4K) and PB6=(128K, 4K). After the creation of the merged level 804, the example extents for the payload blocks is as follows:

PB0=(0, 1K, 1), (4K, 2K, 2), (6K, 2K, 1), (8K, 2042K, 0)
PB1=(0, 20K, 0), (20K, 4K, 2), (24K, 2024K, 0)
PB2=(0, 16K, 0), (16K, 32K, 1), (48K, 2000K, 0)
PB3=(0, 2048, 0)
PB4=(0, 2048, 0)
PB5=(0, 128K, 0), (128K, 4K, 2), (132K, 1916K, 0)
PB6=(0, 256K, 0), (256K, 16K, 1), (272K, 1776K, 0)
PB7=Empty FIG. 9 is a flow diagram illustrating a flow for distributed stream extents representing merged payload block areas across an entire incremental chain. In a step 902, the system obtains a current payload block number from a current position. In a step 904, a determination is made as to whether it is a next payload block. If yes, in a step 906, the system prepares a final distributed stream merge extents for payload block. In a step 908, the system resets the top index to zero. Alternatively, if it is not the next payload block, in a step 909, the system takes a minimum length of extent length and count. In a step 910, a determination is made as to whether the process conforms to a particular architecture of the backup system. In a specific embodiment, the particular architecture includes a Data Domain (DD) architecture as provided by EMC Corporation of Hopkinton, Mass. If the architecture is not a DD architecture, in a step 912, the system sets the position and reads from the stream which denotes the index and writes it. Alternatively, in a step 914, the system rebases the current stream range to the file pointed by the index and subtracts the count. If in a step 916 the count is not zero, the system advances to the top index counter if the extent is consumed, step 909. Alternatively, if the count is zero, the process ends.

Figure 10A:
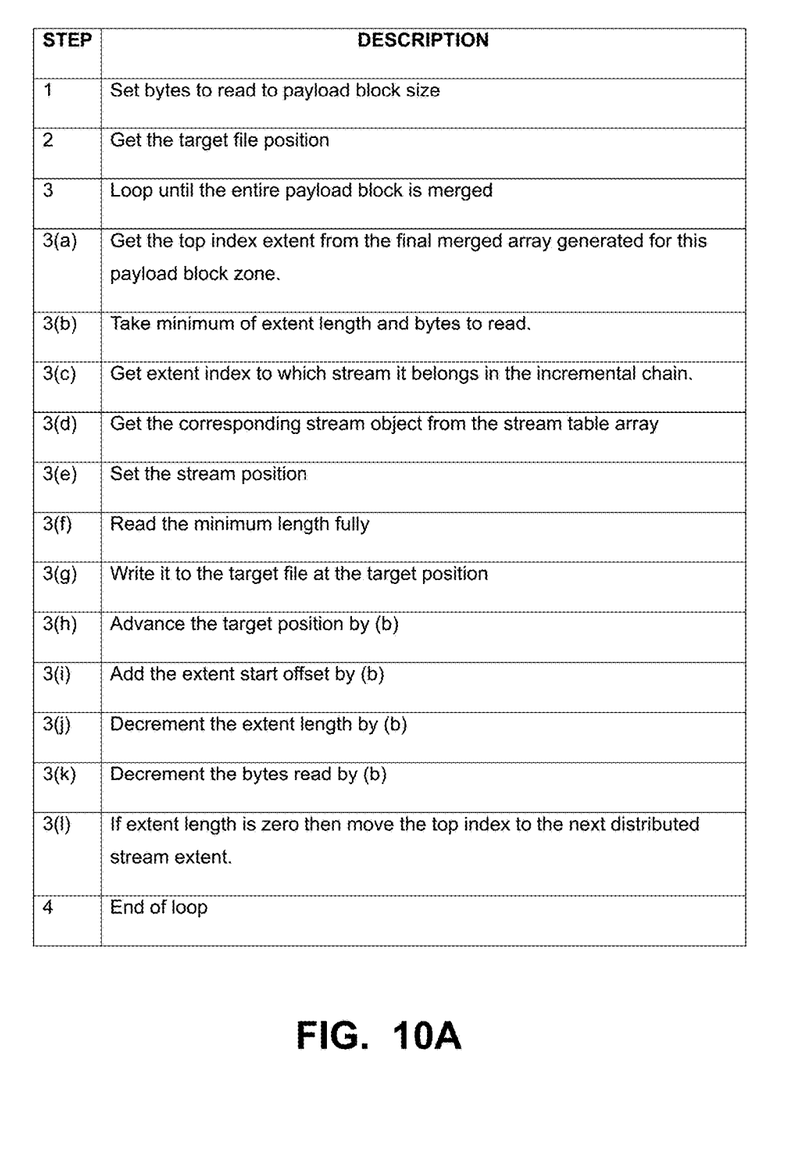
FIG. 10A is a table that lists process steps below for a specific embodiment of read and merge steps during streaming a merged payload block for a regular synthetic merge.

In an embodiment, the process may be used to perform a DD regular synthetic merge. FIG. 10A is a table that lists process steps for a specific embodiment of read and merge steps during streaming a merged payload block for a first type of synthetic merge. This type of synthetic merger may be referred to as a regular synthetic merge.

Figure 10B:
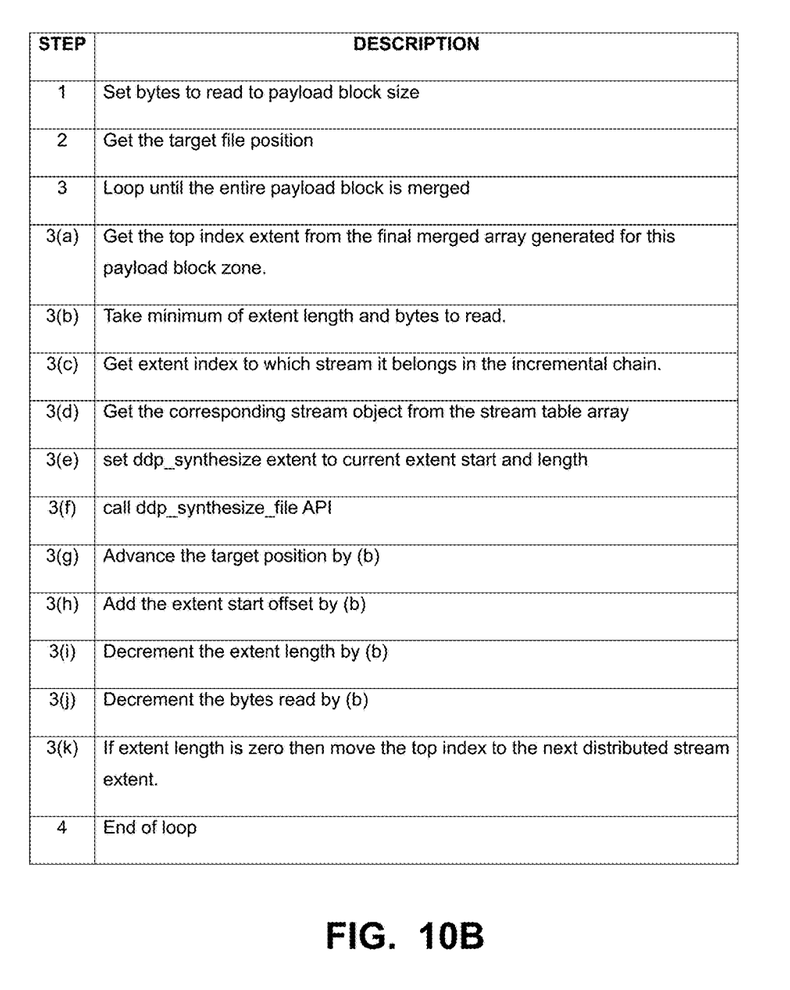
FIG. 10B is a table that lists process steps below for a specific embodiment of read and merge steps during streaming a merged payload block for a native synthetic merge.

Likewise, in an embodiment, the process may be used to perform a DD native synthetic merge. FIG. 10B is a table that lists process steps for a specific embodiment of read and merge steps during streaming a merged payload block for a second type of synthetic merge. This type of synthetic merger may be referred to as a native synthetic merge.

In the description above, certain embodiments were discussed in the context of a VHD formatted file, VHDx formatted file, or both. It should be appreciated, however, that aspects and principles of the system can be applied to other virtual disk formats such as VMDK formatted files (e.g., VMware virtual disk file) which may be used in the Linux OS.

As shown with reference to FIGS. 4 to 6, the backup management process (backup manager) 112 creates a link between the child virtual container with the parent container. In a step, the backup manager streams the child virtual container data and file data to the target (e.g., backup media). In particular, the backup manager prepares an incremental target volume stream in reference to previous backup, links to the previous backup, and places file blocks as appropriate with respect to the target stream.

Figure 11:
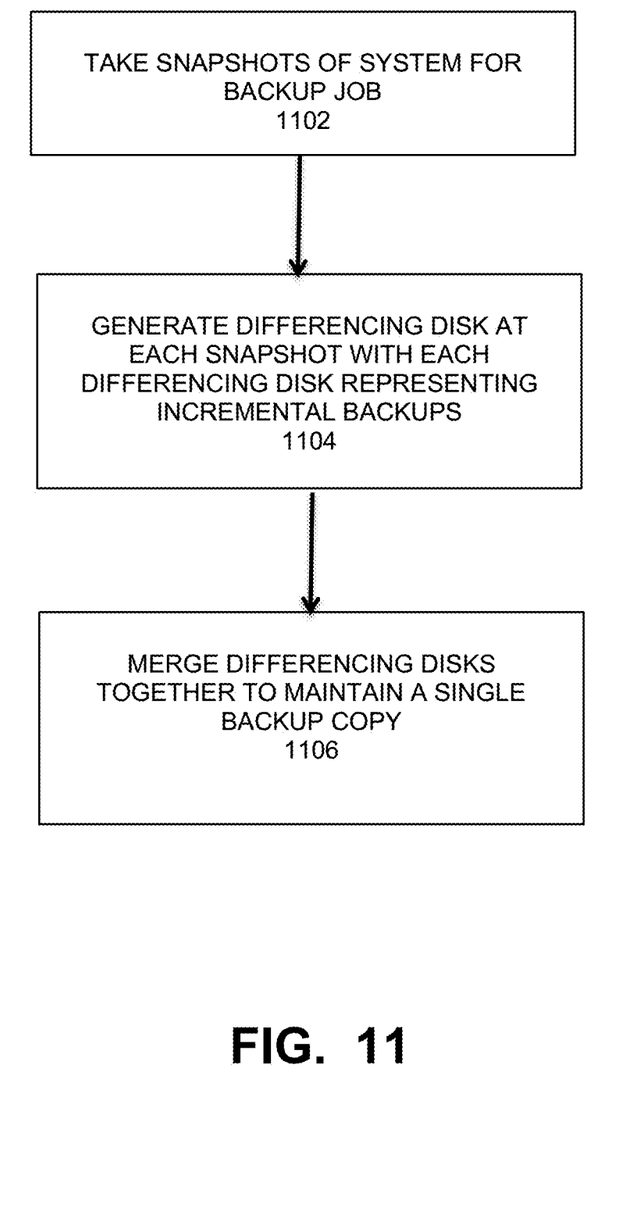
FIG. 11 is a flowchart illustrating basic process steps in performing a virtual disk block consolidation, under an embodiment.

FIG. 11 is a flowchart illustrating basic process steps in performing a virtual disk block consolidation, under an embodiment. In step 1102, the user or a backup process takes file image snapshots of the system for a backup job, in which after a certain number of snapshots a backup operation is performed. The backup process generates a differencing disk at each snapshot with each differencing disk representing incremental backups of the files, step 1104. The differencing disks are merged together to form a single backup copy, step 1106, as described above with respect to the merging operations to form a single VHD/VHDx file.

The following example scenario illustrates a space savings that can be achieved using the disk image consolidation mechanism describe herein. To illustrate an example of optimized space utilization, consider a VM on which user takes multiple snapshots. After a number (e.g., 10) snapshots, the user initiates a backup. The performance can be analyzed with respect to conventional backup technique for a file occupying 200 payload blocks. For the consolidated backup technique of the described embodiments, assuming a change of 10% during each snapshot approximately 20 blocks of snapshot contain changed information. These blocks are merged with the parent disk to create a save set. The size of the payload block count will be at most the size of the payload block of the source virtual disk which is 200 blocks. In the case of conventional backup, the number of payload blocks backed up would be number of user snapshot times the change, which in this case would be 10×20=200 blocks. This along with the parent payload block count would be 400 blocks. Thus, under consolidate backup there would be a saving of 400−200=200*32=6400 MB. In other words, 6.4 GB less data is saved than in the conventional backup method (assuming a block size of 32 MB).

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of reducing storage space required for incremental backup operations of files backed up to target virtual machines in storage system, comprising:
    saving a first snapshot comprising an image of the files at a point in time for a current running configuration of the target virtual machines is saved to a differencing disk;
    taking a first backup of the files at a first time instance to generate a first backup file, the first backup comprising one of a full backup or an incremental backup;
    creating a new differencing disk to capture input/output (I/O) operations involving the files after the first backup;
    taking one or more subsequent backups of the files at respective time instances after the first time instance to generate subsequent corresponding differencing disks as incremental backup files; and
    merging the first backup file and the incremental backup files to form a single incremental backup file, wherein the storage system comprises a deduplication storage system, and wherein the backup is performed between two deduplication storage appliances, and comprises a rebasing operation that comprises backing up each file based on a range, zone, and extent of each source file of the files relative to corresponding target files backed up on the target virtual machines.

2. The method of claim 1 wherein each of the one or more subsequent backups of the files comprises an incremental backup, and wherein the merged first backup file and the incremental backup files are stored as a full backup file.

3. The method of claim 2 wherein the full backup file comprises a synthetic full backup file.

4. The method of claim 1 wherein the storage system comprises a random access storage device.

5. The method of claim 4 wherein the random access storage device comprises one of a disk-based storage device, or a redundant array of independent disks.

6. The method of claim 5 wherein each of the one or more subsequent backups of the files comprises an incremental backup, and wherein the new differencing disk comprises a differencing disk to a previous backup and the merged first backup file and the incremental backup files are stored as an artificially synthesized backup file.

7. The method of claim 6 wherein the full backup file comprises a virtual full backup file.

8. The method of claim 1 further comprising:
accessing a first virtual hard disk file corresponding to a backup of a file, the first virtual hard disk file comprising a first plurality of payload blocks to store data associated with the backup;
accessing a second virtual hard disk file corresponding to an incremental backup of the file on the source volume, the second virtual hard disk file comprising a second plurality of payload blocks to store data associated with the incremental backup; and
comparing a payload block of the first plurality of payload blocks with a corresponding payload block of the second plurality of payload blocks to determine whether the payload blocks should be merged.

9. A system comprising a processor-based executable module configured to reduce storage space required for incremental backup operations of files backed up to target virtual machines in storage system, comprising:
a first component saving a first snapshot comprising an image of the files at a point in time for a current running configuration of the target virtual machines is saved to a differencing disk, and taking a first backup of the files at a first time instance to generate a first backup file, the first backup comprising one of a full backup or an incremental backup;
a second component creating a new differencing disk to capture input/output (I/O) operations involving the files after the first backup, and taking one or more subsequent backups of the files at respective time instances after the first time instance to generate subsequent corresponding differencing disks as incremental backup files; and
a third component merging the first backup file and the incremental backup files to form a single incremental backup file, wherein the storage system comprises a deduplication storage system, and wherein the backup is performed between two deduplication storage appliances, and comprises a rebasing operation, and further wherein the rebasing operation comprises backing up each file based on a range, zone, and extent of each source file of the files relative to corresponding target files backed up on the target virtual machines.

10. The system of claim 9 wherein each of the one or more subsequent backups of the files comprises an incremental backup, and wherein the merged first backup file and the incremental backup files are stored as a full backup file, and wherein the full backup file comprises a synthetic full backup file.

11. The system of claim 9 wherein the storage system comprises a random access storage device embodied as either a disk-based storage device or a redundant array of independent disks.

12. The system of claim 11 wherein each of the one or more subsequent backups of the files comprises an incremental backup, and wherein the new differencing disk comprises a differencing disk to a previous backup and the merged first backup file and the incremental backup files are stored as an artificially synthesized backup file.

13. A computer program product, comprising a non-transitory computer-readable medium having a computer-readable program code embodied therein, the computer-readable program code adapted to be executed by one or more processors to implement a method for reducing storage space required for incremental backup operations of files backed up to target virtual machines in storage system, by:
saving a first snapshot comprising an image of the files at a point in time for a current running configuration of the target virtual machines is saved to a differencing disk;
taking a first backup of the files at a first time instance to generate a first backup file, the first backup comprising one of a full backup or an incremental backup;
creating a new differencing disk to capture input/output (I/O) operations involving the files after the first backup;
taking one or more subsequent backups of the files at respective time instances after the first time instance to generate subsequent corresponding differencing disks as incremental backup files; and
merging the first backup file and the incremental backup files to form a single incremental backup file, wherein the storage system comprises a deduplication storage system, and wherein the backup is performed between two deduplication storage appliances, and comprises a rebasing operation that comprises backing up each file based on a range, zone, and extent of each source file of the files relative to corresponding target files backed up on the target virtual machines.

* * * * *